(12) United States Patent
Ramareddy et al.

(10) Patent No.: US 11,706,092 B2
(45) Date of Patent: Jul. 18, 2023

(54) ACTIVITY-BASED RESOURCE ALLOCATION AMONG VIRTUAL-COMPUTING SESSIONS

(71) Applicant: Citrix Systems, Inc., Burlington, MA (US)

(72) Inventors: Shashidhar Ramareddy, Bangalore (IN); Mudit Mehrotra, Bangalore (IN); Siddheshwar Kamatar, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 120 days.

(21) Appl. No.: 17/215,358

(22) Filed: Mar. 29, 2021

(65) Prior Publication Data

US 2021/0218632 A1   Jul. 15, 2021

Related U.S. Application Data

(63) Continuation of application No. 16/201,089, filed on Nov. 27, 2018, now Pat. No. 10,965,535.

(51) Int. Cl.
*H04L 41/0896* (2022.01)
*H04L 67/01* (2022.01)

(52) U.S. Cl.
CPC .......... *H04L 41/0896* (2013.01); *H04L 67/01* (2022.05)

(58) Field of Classification Search
CPC .............................. H04L 41/0896; H04L 67/01
USPC ....................................................... 709/226
See application file for complete search history.

(56) References Cited

U.S. PATENT DOCUMENTS

| | | |
|---|---|---|
| 7,203,944 B1 | 4/2007 | Van Rietschote et al. |
| 7,277,944 B1 | 10/2007 | Davie et al. |
| 8,429,276 B1 | 4/2013 | Kumar et al. |
| 8,468,251 B1 | 6/2013 | Pijewski et al. |
| 8,863,266 B1 | 10/2014 | Sanyal et al. |
| 8,903,983 B2 | 12/2014 | Bakman et al. |
| 9,003,037 B2 | 4/2015 | Beveridge |
| 9,513,950 B2 | 12/2016 | Beveridge et al. |
| 9,665,630 B1 | 5/2017 | Bigman et al. |
| 10,965,535 B2 | 3/2021 | Ramareddy et al. |
| 2006/0233108 A1 | 10/2006 | Krishnan |
| 2010/0255826 A1 | 10/2010 | Brewer et al. |
| 2011/0093588 A1 | 4/2011 | Karayi et al. |
| 2013/0114497 A1 | 5/2013 | Zhang et al. |

(Continued)

*Primary Examiner* — Nicholas R Taylor
*Assistant Examiner* — Chong G Kim

(57) ABSTRACT

Dynamically controlling use of a shared computing resource by virtual-computing sessions of a client computing device includes storing per-virtual-channel weights representing contributions of session virtual channels to performance, the stored weights including sets of weights for respective distinct application types. A resource allocation operation includes (i) for each session, selecting a set of weights based on a type of application using the session and applying the selected set of weights to activity state data to produce a session activity value, the activity state data representing activity states of the session virtual channels, and (ii) generating resource usage control signals based on the session activity values of the sessions, the resource usage control signals representing a target pattern of use of the shared computing resource by the sessions. An enforcement operation uses the resource usage control signals to establish the target pattern of use of the shared resource by the sessions.

21 Claims, 4 Drawing Sheets

(56) References Cited

U.S. PATENT DOCUMENTS

| | | |
|---|---|---|
| 2014/0032761 A1 | 1/2014 | Beveridge |
| 2015/0212857 A1* | 7/2015 | Beveridge ............... G06F 9/542 |
| | | 718/1 |
| 2016/0094622 A1 | 3/2016 | Thomas et al. |
| 2016/0139948 A1* | 5/2016 | Beveridge ............... H04L 43/08 |
| | | 718/1 |

* cited by examiner

ACTIVITY-BASED RESOURCE ALLOCATION AMONG VIRTUAL-COMPUTING SESSIONS

BACKGROUND

The present invention is related to the field of distributed computing, more particularly to distributed computing in which a client computing device interacts with a server computer via a set of virtual-computing sessions, such as employed for virtual desktops, virtualized applications, etc. Even more particularly, the invention is directed to the allocation of physical resources, such as limited network bandwidth, in such distributed computing systems.

SUMMARY

Certain operating scenarios for computer systems can expose problems with the way that physical computing resources are allocated. Aspects of this problem are briefly described, and an alternative approach that can address this problem is described in detail. The description focuses on network bandwidth as a specific example resource, but those skilled in the art will appreciate that it can be adapted to other resources such as memory, CPU, etc.

A user connecting to a virtual-computing session (such as a remote desktop type of session) from a challenged network connection with low bandwidth may suffer poor performance. This could happen in scenarios like the following:

1. Roaming user connecting from remote client locations or cafes etc.
2. Connecting from a country having weak network infrastructure. For instance, many ASEAN countries rely on satellite link for interstate communication. Another example is Australia, where MPLS links are very rare.

Also, it is common that so-called "thin clients" are used as endpoints in system utilizing virtual-computing session techniques. A typical thin client comes with minimal resources such as CPU, memory, etc. Optimal allocation of these resources can help in enhancing user experience.

Computer systems may try to optimize performance in various ways. In one approach, a client-side virtual-computing agent may optimize performance of virtual channels of a session by assigning relative priority to the virtual channels. This can improve performance within the scope of a single session.

Other approaches may use network-based devices or other client-side or server-side mechanisms based on assigning priorities etc.

However, existing approaches may not address the relative priorities of multiple virtual-computing sessions running on a client device. For instance, there may be two applications launched by a user, with one being actively used and other performing background activity such as a background browser window. In this case, if network bandwidth has been allocated equally to the two sessions, there is inefficiency and performance suffers, because the network bandwidth allocation has not taken into account the differentiation between the active or foreground application and the inactive or background application. This problem will be aggravated when network bandwidth is limited and multiple remote applications are launched by a user which compete for network bandwidth.

An alternative approach for handling such scenarios, described herein, is to intelligently distribute the bandwidth and/or to selectively throttle the bandwidth. This involves identifying the active application(s), discerning user intent, making dynamic resource allocation decisions and implementing them by enforcement mechanisms. Additionally, the technique preferably adapts to administrative policies and/or user environment.

Thus an approach described herein generally involves operations selected from the following, carried out by components operating at a client device and/or a server device or network device or a combination of these devices:

1. Measure the active application/applications requiring higher resources.
2. Monitor the user environment such as network bandwidth, CPU utilization, battery charge level, memory availability, GPU usage etc.
3. Perform predictive analysis based on application hooks, monitoring the environment, user input, etc.
4. Tailor operation according to administrative policy
5. Adapt system operation to accommodate the dynamic resource allocation, such as by increasing keep alive logic and expected delays in packet processing
7. Throttle resource usage across sessions and/or applications.
8. Throttle resource usage within a session.

More particularly, a method is disclosed of dynamically controlling use of a shared computing resource by virtual-computing sessions of a client computing device. The method includes storing per-virtual-channel weights representing contributions of session virtual channels to performance, the stored weights including sets of weights for respective distinct application types. A resource allocation operation includes (i) for each session, selecting a set of weights based on a type of application using the session and applying the selected set of weights to activity state data to produce a session activity value, the activity state data representing activity states of the session virtual channels, and (ii) generating resource usage control signals based on the session activity values of the sessions, the resource usage control signals representing a target pattern of use of the shared computing resource by the sessions. An enforcement operation uses the resource usage control signals to establish the target pattern of use of the shared resource by the sessions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

For an end-user who is launching multiple virtual applications/desktops sessions on an end-point, allocate total bandwidth available on the endpoint device based on activity associated with each virtual session on this end-point. In this approach, sessions are identified that have gone into idle/inactive state, and bandwidth is shifted away from these idle/inactive sessions and used to boost the bandwidth for in-focus/active/maximized sessions. This adaptive, intelligent approach can improve the use of available bandwidth to improve system performance in scenarios where total available bandwidth is low and where the performance of active sessions would have otherwise suffered.

Thus the following are characteristics of the disclosed technique:

a) Redistributing bandwidth (and other resources) available at the end-point/server/network device to ensure that inactive/idle virtual sessions get only a bare minimal and major chunk of available bandwidth is allocated to active virtual sessions.

b) Measuring weighted activity value for each virtual channel of each session and using them to influence the resource allocation (e.g., bandwidth, compute, memory, etc.) on the endpoint between different virtual sessions and within individual sessions.

c) Using event-based correction factors to adjust or correct the decision based on activity for resource allocation.

d) Learning and adapting activity value weights over a period of time based on usage patterns of the user and manual user-feedback.

Description of Embodiments

Figure 1:
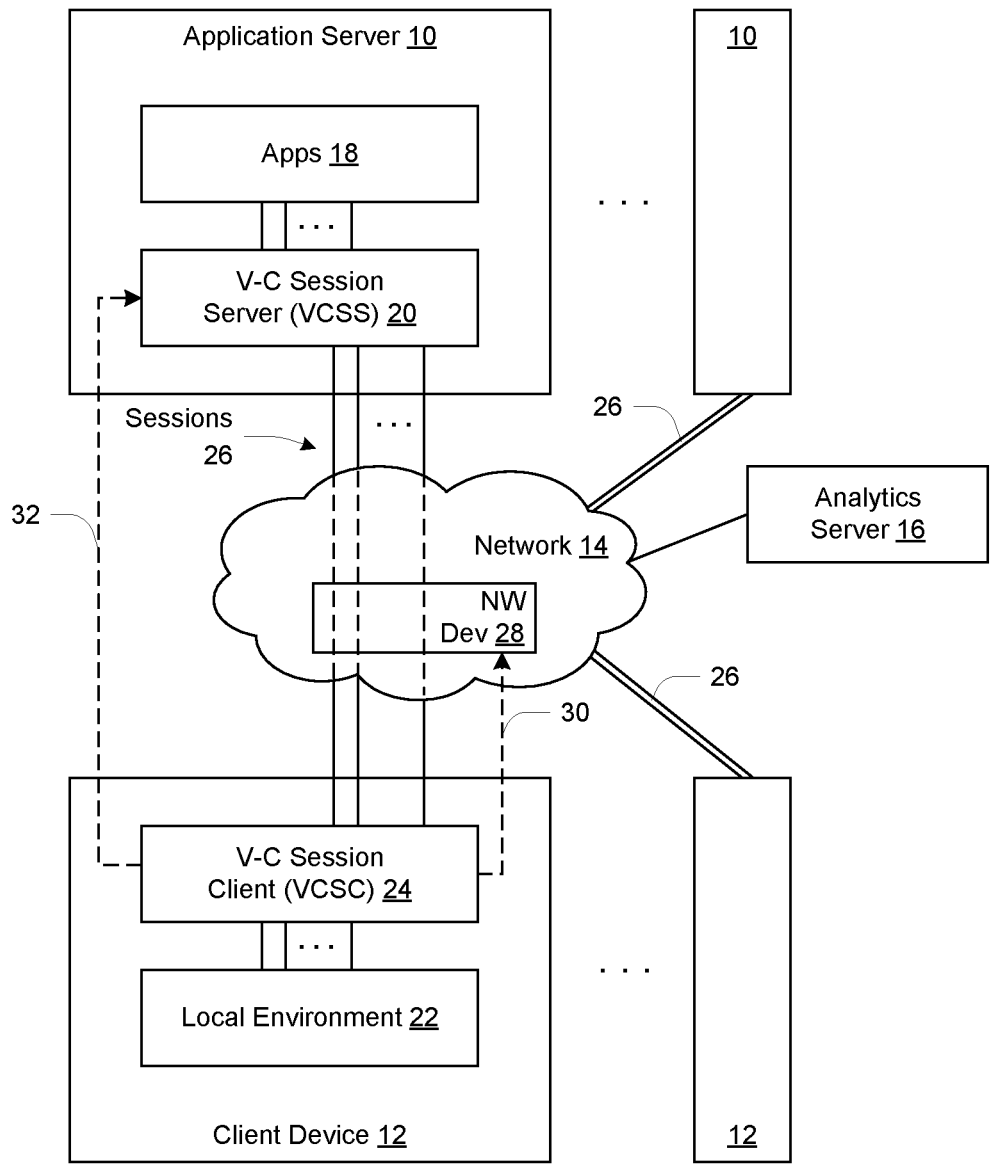
FIG. 1 is a block diagram of a computer system employing activity-based resource allocation among virtual-computing (V-C) sessions.

FIG. 1 shows a computer system including application servers 10 coupled to client devices 12 by a network 14. The application servers 10 are server-type computers with hardware organization as generally known in the art, and the client devices 12 are user-specific computing devices such as desktop computers, portable computers, etc. The system may also include an analytics server 16 as shown. One of the application servers 10 and one client device 12 are shown in detail and described in detail below; in general the described organization and operation applies equally to the other application servers 10 and client devices 12.

An application server 10 has a set of applications or "apps" (Apps) 18 and virtual-computing (V-C) session server (VCSS) 20, and a client device 12 has a local environment 22 and V-C session client (VCSC) 24. In operation, the client device 12 interacts with executing apps 18 via logical channels referred to as "sessions" 26. Sessions are also referred to as "virtual-computing sessions" or "V-C sessions" to reflect a virtual-computing aspect, i.e., that a user interacts with a remote, server-side application 18 as though it were executing locally, using a window or desktop graphical paradigm for example. Generally, the sessions 26 are end-to-end logical entities as described further below, carried through the network 14 operating at lower levels (physical layer, networking layer etc. as generally known). Examples and further description are provided below. In some embodiments the network 14 may include a particular type of network device 28 that may operate at the level of the sessions 26 and thus be used for resource allocation enforcement, for example. An example of such a network device 28 is the CloudBridge device sold by Citrix Systems Inc.

The VCSS 20 and VCSC 24 establish and maintain the V-C sessions 26 and interface them to the apps 18 and local environment 22 respectively. As an illustrative example, one session 26 may be used by the client device to interact with a word-processing app 18, while another session 26 may be used for some other application such as a database application, file transfer, browser, etc. Within each session 26, sub-channels referred to as "virtual channels" or VCs are used to carry communications of corresponding components of the local environment 22 with the apps 18. Generally these components are input/output (I/O) devices such as keyboard, mouse, local storage device, printer, etc., as described more below.

As shown, the VCSC 24 may have communications connections 30, 32 to the NW device 28 and/or the VCSS 20 respectively. The connection 30 is used when the NW device 28 is present and used for resource allocation enforcement, as described more below. The connection 32 may be used in connection with enforcement as well as other functions, as also described more below.

Figure 2:
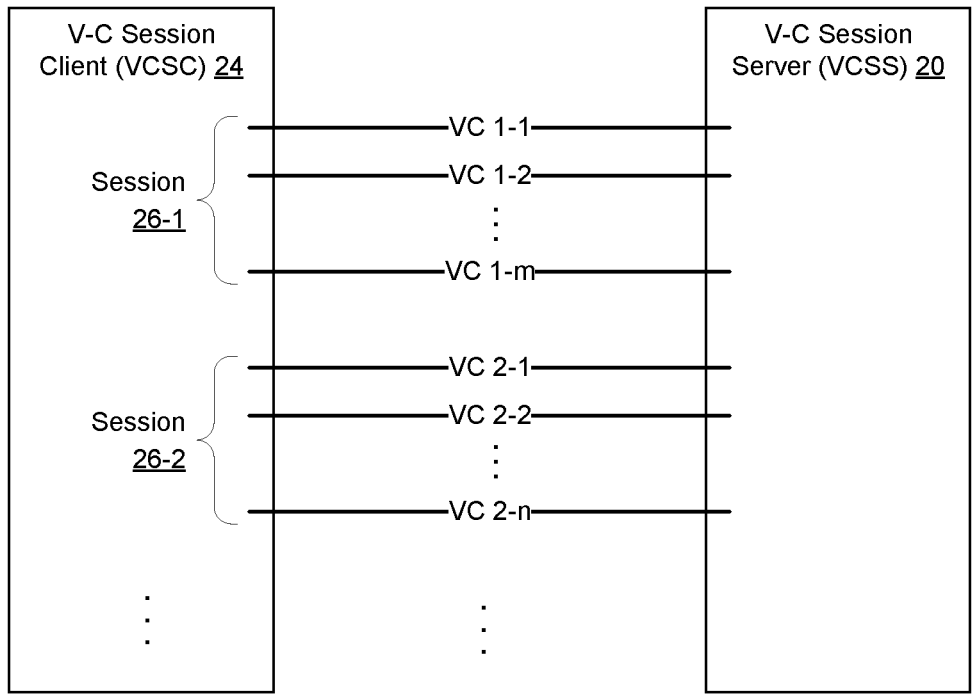
FIG. 2 is a schematic diagram showing V-C sessions extending between a client and server, each session having multiple virtual channels.

FIG. 2 illustrates the structure of each V-C session 26 (26-1, 26-2, etc.) as including respective virtual channels VC. The VCs for session 26-1 are shown as VC 1-1, VC 1-2, . . . while those for session 26-2 are shown as VC 2-1, VC 2-2, . . . , etc.

Figure 3:
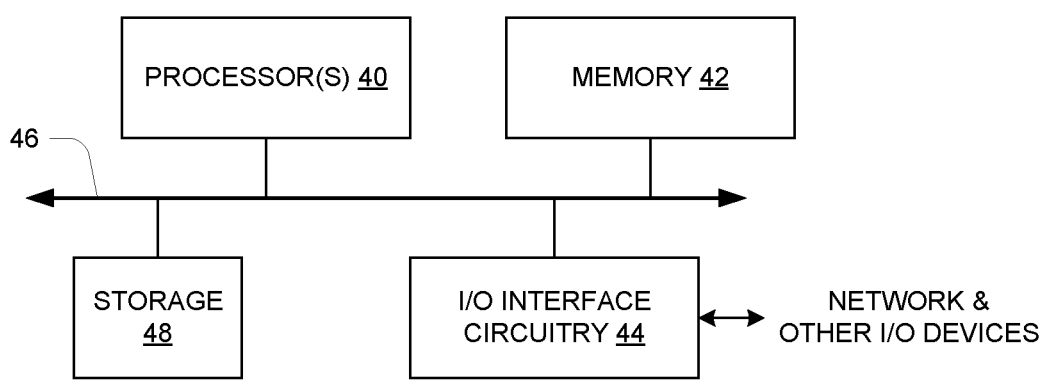
FIG. 3 is a block diagram of a computing device from a hardware perspective.

FIG. 3 shows an example configuration of a physical computer such as a server 10 or client device 12 from a computer hardware perspective. The hardware includes one or more processors 40, memory 42, and interface circuitry 44 interconnected by data interconnections 46 such as one or more high-speed data buses. The interface circuitry 44 provides a hardware connection to the network 14 (FIG. 1) and perhaps other external devices/connections (EXT DEVs). The processor(s) 40 with connected memory 42 may also be referred to as "processing circuitry" herein. There may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a V-C session client application, for example, can be referred to as a V-C session client circuit component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 4:
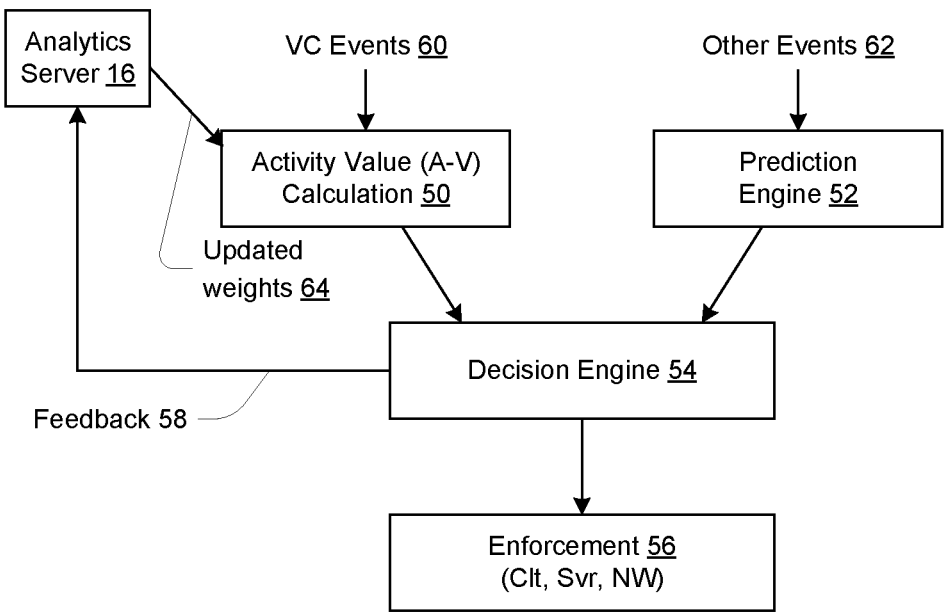
FIG. 4 is a functional block diagram of a set of software-implemented components providing activity-based resource allocation.

FIG. 4 is a block diagram of functional components or modules interacting to provide the activity-based resource allocation described herein. These are generally software-implemented components in corresponding computerized devices of the system, which may vary in different embodiments. Specifics are provided below.

An activity value (A-V) calculation component 50 and a prediction engine 52 provide corresponding inputs to a decision engine 54, which in turn supplies control signals to an enforcement component 56 as well as feedback 58 to the analytics server 16. The A-V calculation component 50 receives virtual-channel event data (VC Events) 60 used to track activity in the virtual channels VC, and the prediction engine 52 similarly receives other event data (Other Events) 62 used to generate event-based correction or adjustment of resource allocation decisions, as described more below. The analytics server 16 provides updated weights 64 to the A-V calculation component 50 to refresh weight values stored therein. The analytics server 16 has the role of storing Below is an example implementation of a table of weights 70. The VCs are named according to the respective type of I/O they are used for. The per-VC weights are also application-specific as shown. Thus the weight for the mouse channel, for example, is 0.7 for a Skype session but 0.6 for a WMP session.

| | Virtual channel (VC) | Application-specific virtual channel bias/weight | Skype | Windows Media player | Autodesk/ photoshop | Video games | File transfer | Windows word | ... |
|---|---|---|---|---|---|---|---|---|---|
| 1. | ThinWire | A1 | 0.2 | 0.8 | Val | Val | Val | Val | |
| 2. | Mouse | A2 | 0.7 | 0.6 | Val | Val | Val | Val | |
| 3. | Keyboard | A3 | 0.7 | 0.6 | Val | Val | Val | Val | |
| 4. | Joystick | A4 | 0.7 | 0.6 | Val | Val | Val | Val | |
| 5. | Microphone | A5 | 0.8 | 0.8 | Val | Val | Val | Val | |
| 6. | CDM | A6 | 0.2 | 0.2 | Val | Val | Val | Val | |
| 7. | Printing | A7 | 0.2 | 0.5 | Val | Val | Val | Val | |
| 8. | Generic USB | A8 | 0.8 | 0.5 | Val | Val | Val | Val | |
| 9. | Scanner | A9 | 0.2 | 0.2 | Val | Val | Val | Val | |
| 10 | Audio | A10 | 0.8 | 0.8 | Val | Val | Val | Val | |
| 11 | Multimedia | A11 | 0.8 | 0.8 | Val | Val | Val | Val | |
| 12 | Other VC's | A12 | 0.2 | 0.2 | Val | Val | Val | Val | | activity data, feedback and deriving the mathematical expression with weights using that data. This server could be single/multiple with separated and/or unified roles.

In one embodiment the A-V calculation component 50, prediction engine 52, and decision engine 54 are all located within a client device 12, more specifically as part of VCSC 24 (FIG. 1). In alternative embodiments, one or more of these components may be located within the VCSS 20, as described more below. As indicated, the enforcement component 56 may be located within any one or more of the client device (Clt) 12, application server (Svr) 10, or network device (NW) 28. Other aspects of the interfaces and interactions among the components are described below.

Figure 5:
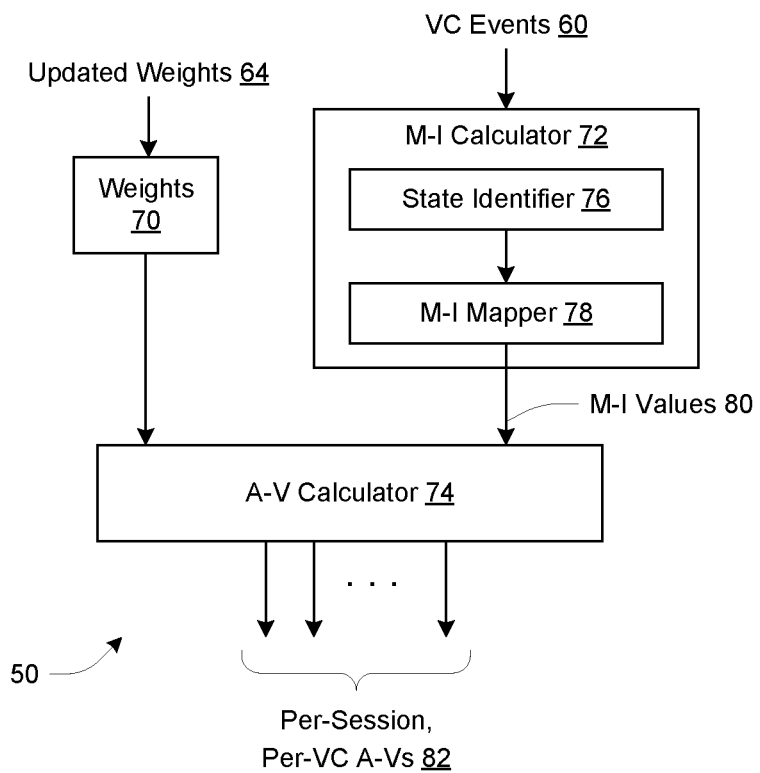
FIG. 5 is a block diagram of an activity value calculation component.

FIG. 5 illustrates the A-V calculation component 50. It includes a store for weights 70, a measured-influencer (M-I) calculator 72, and an activity value (A-V) calculator 74. The M-I calculator 72 includes a state identifier 76 and an M-I mapper 78. The M-I calculator 72 generates values referred to as "measured influencer" (M-I) values 80 to the A-V calculator 74, which uses the M-I values 80 along with the stored weights 70 to generate per-session, per-VC activity values (A-Vs) 82. The M-I values 80 are values representing activity states of the various VCs, while the A-Vs 82 are values representing weighted activity levels of the VCs, provided to the decision engine 54 (FIG. 4) to influence operation of the enforcement component 56.

More specifically, the A-V calculator 74 uses the weights 70 and M-I values 80 to arrive at the A-Vs 82. This calculation is performed first on a per-VC basis, and in one embodiment is as follows:

Activity value($AV\_N$)=Weight($A\_N$)×Measured Influencer($M\_N$), where:

Activity value ($AV\_N$) is the activity value for the Nth VC:

Weight ($A\_N$) is an application-specific and virtual-channel specific weight value for the Nth VC, as described more below;

Measured Influencer ($M\_N$) is a dynamic indicator of activity state of the Nth VC, also described more below.

Alternately, applications could be grouped into categories as appropriate and weights be defined on a category basis rather than on an individual application basis. In one example, the following categories might be used:
Bi-direction communication: Skype
Interactive: Word, gaming, Photoshop
Bulk: Scanning, printing, file transfers
Streaming: Media player Below are table representations of the logic of the M-I calculator 72 in one embodiment, which includes state identification logic (state identifier 76) and M-I mapping (M-I mapper 78). One specific example is discussed to explain this logic, then several other table representations are provided for a full set of M-I values 80 as might be useful in a given embodiment. It will be appreciated that this set of tables is specific to allocation of network bandwidth in particular. If the technique is used for other types of resources, such as memory, CPU, etc., then in general the specifics of such tables may vary accordingly.

The example for detailed explanation is a Thinwire VC, which is used for remote display functionality (i.e., it carries the data and control values by which the VCSS 20 and VCSC 24 collaborate to enable a desktop, application window, etc., generated at the application server 10 to be displayed in the local environment 22 of the client device 12).

| Measured Influencer (M1) for Thinwire virtual channel: | | |
|---|---|---|
| State | Value | Notes |
| Maximized | 1 | |
| Minimized | F(t) which goes from current value (either 1 or 0.4) to 0 in 60 sec. | F(t) could be linear or logarithmic or step function |
| Windowed | 0.4 | |
| Windowed and focused | 1 | |

In the above representation, state identification 76 is represented by the values in the "State" column as well as other information. For this logic, the M-I calculator receives events 60 pertaining to user interaction with the session window—events such as maximizing, minimizing, windowing, and gaining or losing focus (e.g., clicking in the window to obtain focus, clicking elsewhere to lose focus). There may also be a timing component, which is indicated for the Minimized state and described below. The state identifier 76 receives these events and tracks the current Thinwire state accordingly.

Based on the current state, the corresponding value in the Value column is output as the M-I value 80 for the Thinwire VC. This is the mapping function of the M-I mapper 78—translating the current state to an M-I value. For many states such as Maximized, the value is static. In some cases, there is also a timing component. This is indicated for the Minimized state, for which the output M-I value ramps down over a short period after entering that state. Thus the M-I calculator 72 responds to a transition into Minimized by starting a timer, and the output value is ramped down over the timer period according to some function shown as F(t). As indicated, in different examples F(t) is linear, logarithmic, or a step function.

Another way of describing the above logic is that for the Thinwire VC, there is at least one high activity state and at least one low activity state, with the high activity state corresponding to active current use of the Thinwire VC, and the low activity state corresponding to current non-use (or perhaps low use) of the Thinwire VC. In this example, both the Maximized state and the Windowed and Focused state are high-activity states, and the Minimized state is a low-activity state. The Windowed state (not focused) is an intermediate-activity state.

Below are shown several other table representations for logic of the M-I calculator 72 for corresponding VCs. Again, these examples reflect use for allocation of network bandwidth in particular; other specifics may apply when other resource types are being managed. Almost all of these include both a high activity state and a low-activity state; the Audio channel is an exception in providing only one value for use at all times.

| Measured Influencer (M2) for mouse virtual channel: | | |
|---|---|---|
| State | Value | Notes |
| Mouse idle for 0 sec to 120 sec | 1 | |
| No mouse activity beyond 120 sec | F(t) which goes from current value to 0.5 in 60 sec. | F(t) could be linear or logarithmic or step function |

| Measured Influencer (M3) for keyboard virtual channel: | | |
|---|---|---|
| State | Value | Notes |
| No keyboard activity for 0 to 120 sec | 1 | |
| No keyboard activity beyond 120 sec | F(t) which goes from current value to 0.5 in 60 sec. | F(t) could be linear or logarithmic or step function |

| Measured Influencer (M4) for joystick virtual channel: | | |
|---|---|---|
| State | Value | Notes |
| No joystick activity for 0 to 120 sec | 1 | |
| No joystick activity beyond 120 sec | F(t) which goes from current value to 0.5 in 60 sec. | F(t) could be linear or logarithmic or step function |

| Measured Influencer (M5) for microphone virtual channel: | | |
|---|---|---|
| State | Value | Notes |
| Unmuted | 1 | |
| Muted | 0.2 | |

| Measured Influencer (M6) for CDM virtual channel: | | |
|---|---|---|
| State | Value | Notes |
| Active | 0.8 | |
| Inactive | 0.1 | |
| Client drive not mapped | 0 | |

| Measured Influencer (M7) for printing virtual channel: | | |
|---|---|---|
| State | Value | Notes |
| Print triggered | 1 | |
| No printing | 0 | |

| Measured Influencer (M8) for Generic USB virtual channel: | | |
|---|---|---|
| State | Value | Notes |
| USB redirection enabled (irrespective of activity) | 1 | |
| USB redirection disabled | 0 | |

| Measured Influencer (M9) for scanner virtual channel: | | |
|---|---|---|
| State | Value | Notes |
| Scan triggered | 1 | |
| No scan activity | 0 | |

| Measured Influencer (M10) for audio virtual channel: | | |
|---|---|---|
| State | Value | Notes |
| Irrespective of the state | 1 | |

Measured Influencer (MI1) for multimedia virtual channel:

| State | Value | Notes |
|---|---|---|
| Maximized | 1 | |
| Minimized | F(t) which goes from current value (either 1 or 0.7) to 0 in 60 sec. | F(t) could be linear or logarithmic or step function |
| Windowed | 0.7 | |
| Windowed and focused | 1 | |

As described above, each activity value AV-N 82 for a given VC is calculated as the product of a corresponding weight A_N and corresponding M-I value M_N. The per-AC A-Vs 82 are provided to the decision engine 54 for use in resource allocation.

Figure 6:
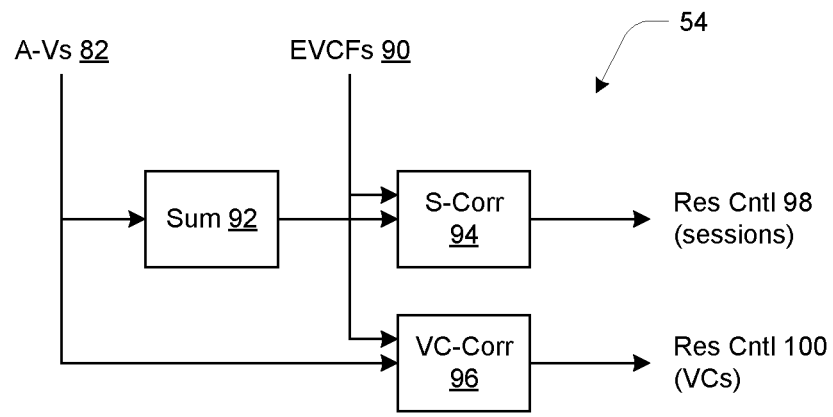
FIG. 6 is a block diagram of a decision component including event-based correction.

FIG. 6 shows high-level structure of the decision engine 54 in one embodiment. Its function is to distribute the use of the subject resource (e.g., network bandwidth) across the sessions 26 based on activity as represented by the A-Vs 82, as well as on other events 62 as represented by event-based correction factors (EVCFs) 90 generated by the prediction engine 52 (FIG. 4). To this end, the decision engine 54 includes summation logic (Sum) 92, session correction (S-Corr) logic 94, and VC correction (VC-Corr) logic 96. The session correction logic 94 outputs session-level resource usage control signal (Res Cntl) 98, and the VC correction logic 96 outputs VC-level resource usage control signal (Res Cntl) 100. In some embodiments, session-level resource usage control (also referred to as "throttling") may be sufficient, while in other embodiments there may be benefit to also distributing a session-level allocation among individual VCs of a session.

In one approach, bandwidth allocated for a session 20 should be proportional to the total activity of its constituent VCs, subject to correction based on other events. This general approach is reflected in FIG. 6. The sum logic 92 calculates a sum of the per-VC activity values 82 across all VCs of a given session 20. This sum may be used raw or it may be modified according to some function f, which may be linear, logarithmic or some other non-decreasing function. The sum (or function thereof) is supplied to the session correction logic 94 along with the EVCFs 90. The session correction logic 94 may be realized such that it simply passes through the sum value from summing logic 92 if no event-based correction is necessary. In such a case, the resource usage control signal 98 for a given session will be proportional to the sum value from the summing logic 92, and thus proportional to the weighted sum of M-I values 80 for all VCs of the session. In alternative embodiments, some alternative mathematical expression may be used that incorporates the weights derived from influencers. Event-based correction can be done as a modification of a given sum value. Examples are given below.

The VC correction logic 96 effects a distribution of resource usage across individual VCs of a session, by generating the VC-level resource usage control signals 100 accordingly. In one embodiment, the VC correction logic 96 also may be realized as a pass-through of the A-Vs 82 for the corresponding VCs, subject to event-based correction. In this example, resource usage control signal 100-N for a given VC (VC-N) is proportional to AV_N, absent event-based correction.

For event-based correction, based on either user-triggered events or extraneous environment parameters, an EVCF 90 is calculated and used in the decision of bandwidth allocation along with the activity value, in the correction logics 94, 96. Examples of such correction scenarios are as follows:

1. Alt-tab or mouse hover-over on session tiles in the docking bar. This event means that user is about to switch windows, so the correction factor should discount the activity in the resource allocation decision because all activity values are soon going to change.

2. New session launch. As a new session launches, there might not be much activity associated with the new session, but the activity-based allocation decision may be modified to prevent a new session from being starved of bandwidth because of low initial activity.

3. Accessibility settings of operating systems (e.g. Accessibility settings for visually-impaired users) may override any activity value based decisions.

4. Application-specific triggers such as end-of-meeting in Skype, Outlook reminder, etc. and usage-defined events/parameters such as time-of-the-day, GPS locations, docking/undocking etc. may be used to adjust the decision of bandwidth allocation.

The above description is directed to a client-based decision engine 54. Alternatively, the decision engine 54 may be server-based, i.e., located at the application server 10 for example. In this case, the client 12 sends activity data to the server 10, and certain actions may be performed to optimize resource usage based of the activity data. Servers involved in this way may perform various operations for managing resource usage such as the following:

1. Reducing the amount of data being sent to client
2. Increasing a timeout value for a session
3. Reducing the rendering rate (frames per second or "fps") of video
4. Determining usage of licensed apps and prompting a user to close an application to optimize license usage
5. Informing an administrative user who may be able to adjust a user's network environment (or other resource pool) to improve performance It may be desirable also to maintain some minimum quota of resources allocated to minimized/out-of-focus sessions so that any time the corresponding windows are maximized or brought back into focus, performance does not suffer unduly.

Figure 7:
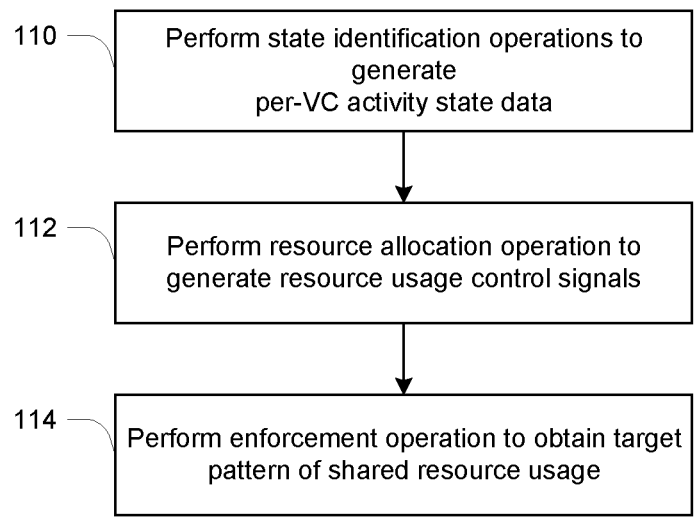
FIG. 7 is a flow diagram of a process of activity-based resource allocation.

FIG. 7 illustrates key operation at a high level. The method dynamically controls use of a shared computing resource (such as network bandwidth) by a set of virtual-computing sessions of a client computing device (e.g., 12), each session including a respective set of virtual channels for respective input/output (I/O) functions of the session.

At 110, state identification operations are performed on per-virtual-channel (per-VC) event data to identify respective activity states of the virtual channels. The activity states include, for each virtual channel, a high activity state and a low activity state, with the high activity state corresponding to active current use of the respective I/O function, and the low activity state corresponding to current non-use of the respective I/O function. The activity states are represented by corresponding activity state data.

At 112, a resource allocation operation is performed using the activity state data. In general, this includes (i) accumulating, for each session, activity state data for all virtual channels of the session to produce a respective per-session activity value, and (ii) using the per-session activity values for the sessions to generate respective resource usage control signals for the sessions. The resource usage control signals represent a target pattern of use of the shared computing resource by the sessions based on their respective activity values.

At 114, an enforcement operation is performed using the resource usage control signals to establish the target pattern of use of the shared resource by the sessions. As mentioned, enforcement may also be viewed as adjusting or throttling use of the resource. Enforcement techniques can include:

1. Using APIs provided by an operating system of the client device 12.
2. Using mechanisms at a networking layer of the VCSC 24.
3. Using the driver in the network stack of operating system such as NDIS drivers in Windows.

Analytics

The analytics server 16 (FIG. 1) can provide both an initial set of weights 70 as well as ongoing updated weights 64 (FIG. 5). The prior knowledge of the behavior of the applications 18 may be used as a starting point for assigning initial weights 70 to sessions. These weights, and perhaps the parameters for the Measured Influencer formulas as well, may be further refined based on feedback from the end-user and the effectiveness of decisions to increase the resources allocated to maximized or in-focus windows by reducing resources used by minimized and out-of-focus windows. Calculations may be driven by data provided from multiple client devices 12, i.e., the learning aspect is influenced by operation across the entire system, not just for one client device 12 or server 10.

User feedback could be manually entered ratings given by user as well as learning of user behavior. For example, a user closing an application and re-launching may be interpreted as negative re-enforcement to adjust the weights accordingly. Effectiveness of decisions can be measured by comparing experience key performance indicators (KPIs). For example, frame-rate rendered on the client side may be compared to frame-rate processed at the server side, as well as the time to bridge the gap between client fps and server fps. For such a technique, the server-side equivalent of the KPI may be used as a benchmark). In a cloud implementation, feedback learned from across multiple customers can be used jointly to adjust global settings of weights and parameters for the Measured Influencer formula.

Usage and application of the analytics could be based on per user/user group/application/application group/time of the day/industry.

User feedback may be obtained by measurement of activity value on the client device 12. This builds on weights learned by the analytics server 16, and further uses parameters from current usage (like session activity) and environment (like effective network bandwidth seen by the device 12) to arrive at the activity value.

Allocation decisions may also be enforced based on administratively configured policies.

Alternatives

The description above is directed to allocation of network bandwidth on the client side. Similar approaches can be used to control usage of other limited resources on the client side, such as CPU usage, GPU usage, disk usage, etc.

A measure of activity value and client environment could be used in devices such as Netscaler and Director to do proactive maintenance of the environment.

Activity values could also be manually specified by an end-user. For instance, an end-user could explicitly mark a virtual session as inactive and another virtual session as active.

On the server side, by throttling the CPU usage based on activity value, further optimization on the common gateway protocol (CGP) could be achieved. This may optimize cost of the server by limiting usage of CPU, GPU, network, or other physical/virtual device.

Enforcing the learning and deriving could be any combination of servers with dedicated roles/independent roles such as data store, analytics server, load balancer to achieve these roles.

A combination of on-premise and cloud solutions could be utilized as well.

While various embodiments of the invention have been particularly shown and described, it will be understood by those skilled in the art that various changes in form and details may be made therein without departing from the scope of the invention as defined by the appended claims.

What is claimed is:

1. A method of dynamically controlling use of a shared computing resource by a set of virtual-computing sessions of a client computing device, comprising:
    storing per-virtual-channel weights representing relative contributions of virtual channels of each session to performance of the session, the stored weights including sets of weights for respective distinct application types;
    performing a resource allocation operation including (i) for each session, selecting a set of weights based on a type of application using the session and applying the selected set of weights to activity state data to produce a session activity value, the activity state data representing activity states of the session virtual channels, and (ii) generating resource usage control signals based on the session activity values of the sessions, the resource usage control signals representing a target pattern of use of the shared computing resource by the sessions; and
    performing an enforcement operation using the resource usage control signals to establish the target pattern of use of the shared resource by the sessions.

2. The method of claim 1, further including adapting the weights over time based on usage patterns of a user.

3. The method of claim 1, wherein the resource usage control signals are generated using the session activity values and event-based correction factors applied to reflect additional events occurring at the client computing device.

4. The method of claim 3, wherein the additional events include one or more of a mouse hover over a window of an inactive session, or a launch of a new session.

5. The method of claim 1, wherein the shared computing resource is network bandwidth.

6. The method of claim 1, wherein the sessions are virtual-desktop or virtual-application sessions having windows generated at an application server being displayed in the local environment of the client computing device.

7. The method of claim 1, wherein the virtual channels of each session are channels for respective input/output functions including one or more of display, keyboard, mouse, or audio for the respective session.

8. The method of claim 1, wherein the resource allocation operation includes using the session activity values for the sessions to generate respective additional resource usage control signals for the virtual channels, the additional resource usage control signals representing a target pattern of use of the shared computing resource by the virtual channels based on their respective session activity values.

9. The method of claim 1, wherein the enforcement operation includes client-side throttling of usage of the shared computing resource performed at the client computing device.

10. The method of claim 9, wherein the client-side throttling is performed by a virtual-computing session component that maintains and utilizes the virtual-computing sessions at the client computing device.

11. The method of claim 1, wherein the virtual-computing sessions extend between the client computing device and an application server, and wherein the enforcement operation includes server-side throttling of usage of the shared computing resource performed at the application server.

12. The method of claim 1, wherein the virtual-computing sessions extend between the client computing device and an application server through an intermediate network device, and wherein the enforcement operation includes throttling of usage of the shared computing resource performed at the intermediate network device.

13. A client computing device operable to dynamically control use of a shared computing resource by a set of virtual-computing sessions, the client computing device including processing circuitry storing and executing computer program instructions to perform a method including:
   storing per-virtual-channel weights representing relative contributions of virtual channels of each session to performance of the session, the stored weights including sets of weights for respective distinct application types;
   performing a resource allocation operation including (i) for each session, selecting a set of weights based on a type of application using the session and applying the selected set of weights to activity state data to produce a session activity value, the activity state data representing activity states of the session virtual channels, and (ii) generating resource usage control signals based on the session activity values of the sessions, the resource usage control signals representing a target pattern of use of the shared computing resource by the sessions; and
   performing an enforcement operation using the resource usage control signals to establish the target pattern of use of the shared resource by the sessions.

14. The client computing device of claim 13, wherein the method further includes adapting the weights over time based on usage patterns of a user.

15. The client computing device of claim 13, wherein the resource usage control signals are generated using the session activity values and event-based correction factors applied to reflect additional events occurring at the client computing device.

16. The client computing device of claim 13, wherein the shared computing resource is network bandwidth.

17. The client computing device of claim 13, wherein the sessions are virtual-desktop or virtual-application sessions having windows generated at an application server being displayed in the local environment of the client computing device.

18. The client computing device of claim 13, wherein the enforcement operation includes client-side throttling of usage of the shared computing resource performed at the client computing device.

19. The client computing device of claim 18, wherein the client-side throttling is performed by a virtual-computing session component that maintains and utilizes the virtual-computing sessions at the client computing device.

20. The client computing device of claim 13, wherein the virtual-computing sessions extend between the client computing device and an application server, and wherein the enforcement operation includes server-side throttling of usage of the shared computing resource performed at the application server.

21. The method of claim 1, further including:
   performing state identification operations on per-virtual-channel event data to identify the activity states of the virtual channels represented by the activity state data; and
   accumulating, as part of the resource allocation operation for each session, the activity state data for all virtual channels of the session to produce the respective session activity value.

* * * * *